United States Patent
Adityaputra et al.

(10) Patent No.: US 9,823,064 B1
(45) Date of Patent: Nov. 21, 2017

(54) APPARATUS FOR CONTACT ANGLE MEASUREMENT

(71) Applicant: Amazon Technologies, Inc., Seattle, WA (US)

(72) Inventors: Muhammad Arief Adityaputra, Eindhoven (NL); Mathieu Hampton, Mierlo (NL); Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 572 days.

(21) Appl. No.: 14/488,141

(22) Filed: Sep. 16, 2014

(51) Int. Cl.
  *G01B 11/26* (2006.01)
(52) U.S. Cl.
  CPC .................................. *G01B 11/26* (2013.01)
(58) Field of Classification Search
  CPC ... G03B 27/42; G03F 7/70916; G03F 7/7085; G03F 7/70341
  See application file for complete search history.

(56) References Cited

U.S. PATENT DOCUMENTS

| 2007/0109517 A1* | 5/2007 | Takaiwa | G03B 27/42 355/53 |
| 2010/0296068 A1* | 11/2010 | Shibazaki | G01D 5/266 355/30 |

* cited by examiner

*Primary Examiner* — Luke D Ratcliffe
(74) *Attorney, Agent, or Firm* — Lee & Hayes, PLLC

(57) ABSTRACT

Subject matter disclosed herein relates to arrangements and techniques that provide for improving contact angle measurement of a liquid droplet on an interface. An apparatus for measuring contact angles of a liquid droplet on a substrate comprises a platform configured to support the substrate and a camera configured to capture images of a liquid droplet on the interface. The apparatus further comprises multiple light sources to illuminate the liquid droplet along multiple direction and multiple optical paths to direct light illuminating the liquid droplet to the camera.

18 Claims, 9 Drawing Sheets

APPARATUS FOR CONTACT ANGLE MEASUREMENT

BACKGROUND

Many portable electronic devices include displays for displaying various types of images. Examples of such displays include electrowetting displays (EWDs), liquid crystal displays (LCDs), electrophoretic displays (EPDs), light emitting diode displays (LED displays), etc. For example, in EWD applications, an applied voltage is utilized to change the surface tension of a liquid in relation to a surface. For instance, by applying a voltage to a hydrophobic surface via a pixel electrode in conjunction with a common electrode, the wetting properties of the surface can be modified so that a second liquid has a greater affinity for the surface. Thus, the quality of the surface is important for operation of the EWD. One way to determine quality of a surface is by measuring a contact angle of a drop of liquid on a surface. The contact angle is the angle, conventionally measured through the liquid, where a liquid/vapor interface meets a solid surface. It quantifies the wettability of a solid surface by a liquid via the Young equation, $0=\gamma_{SG}-\gamma_{SL}-\gamma_{LG}\cos\theta_C$, where the solid-vapor interfacial energy is denoted by $\gamma_{SG}$, the solid-liquid interfacial energy is denoted by $\gamma_{SL}$ the liquid-vapor interfacial energy (i.e. the surface tension) is denoted by $\gamma_{LG}$, and the equilibrium contact angle is denoted by $\theta_C$.

Conventional contact angle measurement generally involves the use of a goniometer that utilizes a single, charge-coupled device (CCD) camera or a digital camera to obtain images of a droplet on an interface, such as, for example, a substrate surface, to measure the dynamic angle of a liquid on the interface. The contact angle is measured by mounting a CCD camera perpendicular to a liquid droplet to observe the wetting behavior and make sure that a reference needle of the goniometer is in the center position with respect to the droplet when measuring the contact angle. Generally, such conventional methods have a disadvantage in that only one-dimensional calibration is provided, i.e. along an X direction, which results in the observer only seeing the needle centered along the X direction while along the Y direction, the needle may not be properly centered with respect to the droplet. For example, FIG. 1A illustrates a liquid droplet 100 on a substrate 102 viewed along the X direction where a dispensing needle 104 is centered with respect to the liquid droplet 100. However, if the substrate 102 is rotated 90 degrees, it can be seen in FIG. 1B that the needle 104 is not centered with respect to the liquid droplet 100 viewed along the Y direction. Such misalignment of the needle 104 generally affects the results of the contact angle measurement since the camera focuses on the needle 104 when obtaining images for the contact angle measurements.

BRIEF DESCRIPTION OF THE DRAWINGS

The detailed description is described with reference to non-limiting and non-exhaustive embodiments illustrated in the accompanying figures. The same reference numerals in different figures refer to similar or identical items.

DETAILED DESCRIPTION

The present disclosure provides arrangements and techniques that provide for improving contact angle measurement of a liquid droplet on an interface such as, for example, a substrate.

In accordance with various embodiments, an apparatus for measuring contact angles of a liquid droplet on an interface is configured such that a camera can generate image data to record images along at least two different directions, i.e., the X and Y directions. The apparatus includes multiple light sources that are arranged to illuminate a liquid droplet on an interface such as, for example, a substrate surface. Light from the light sources illuminates the liquid droplet and is reflected by an arrangement of mirrors such that images of the liquid droplet are captured by the camera. The camera can record images of the liquid droplet in order to measure the contact angle of the liquid droplet on the interface. The contact angle can be used to indicate quality of the interface with respect to, for example, wetting properties of the interface.

In observing the images captured by the camera, a dispensing needle that dispenses the liquid droplet is centered with respect to the liquid droplet. To prevent misalignment of the needle, observing the liquid droplet and the needle from two perpendicular axes simultaneously before obtaining images of the liquid droplet for the contact angle measurements can help ensure that the needle is centered with respect to the liquid droplet along at least two directions. This can be achieved by either moving the interface and liquid droplet relative to the needle and/or by moving the needle relative to the interface and the liquid droplet. Once the needle is centered and focused with respect to the liquid droplet, then the contact angle of the liquid droplet on the interface can be measured more accurately by obtaining multiple images of the liquid drop along the two directions and using the multiple images to calculate multiple contact angle measurements.

Figure 2A:
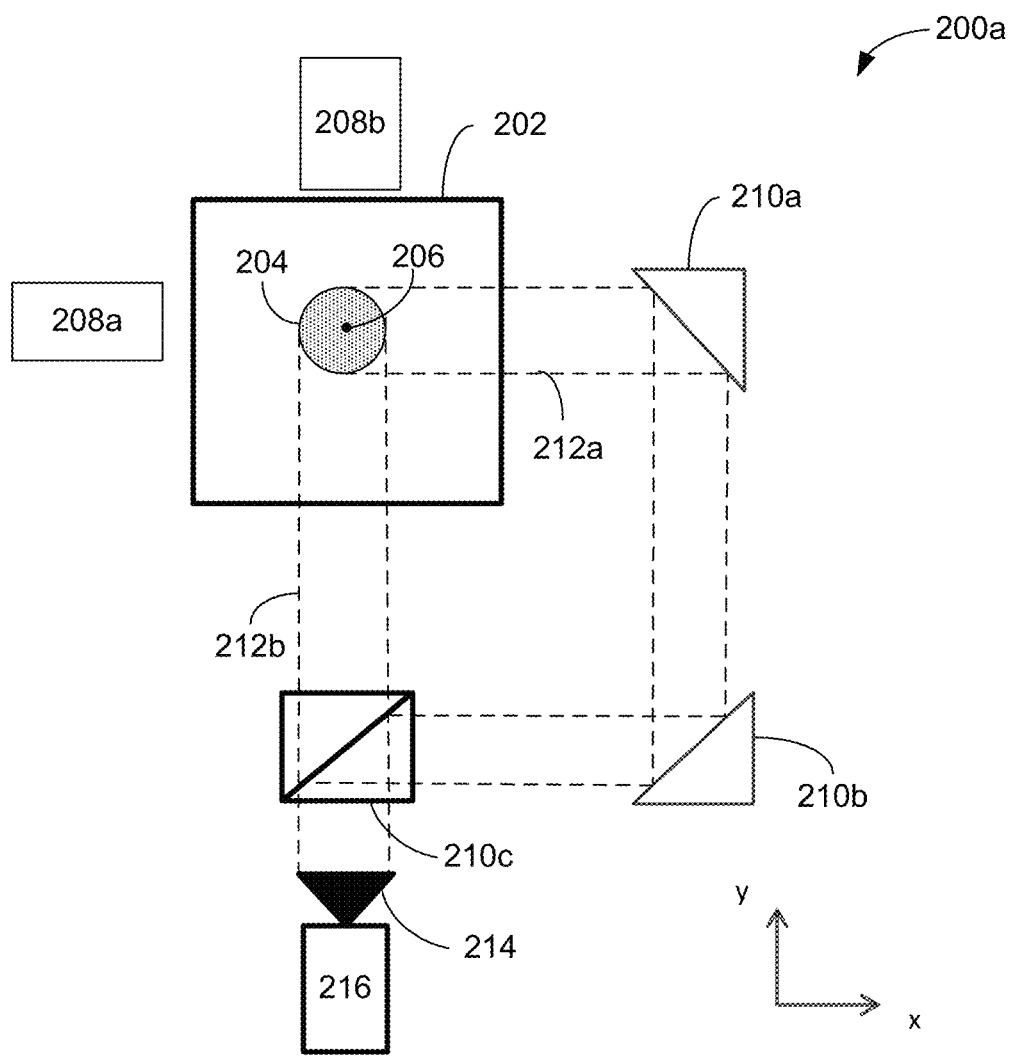
FIGS. 2A and 2B schematically illustrate example embodiments of a multi-view apparatus for measuring contact angles of a liquid droplet on an interface, according to various embodiments.

FIG. 2A schematically illustrates an example of an embodiment of an apparatus 200a for measuring contact angles of a liquid droplet within an X-Y plane on an interface 202, in accordance with various embodiments. The apparatus 200a can be used to obtain multiple contact angle measurements as will be described further herein. An interface 202, such as a substrate, is located on a platform (not illustrated in FIG. 2A). A liquid droplet 204 is located on the interface 202. A dispensing needle 206 that dispenses the liquid droplet 204 is centered with respect to the liquid droplet 204 as will be discussed further herein. Two light sources 208 are located perpendicular to one another. A first light source 208a backlights the liquid droplet 204 to illuminate the liquid droplet 204 along the X direction while a second light source 208b backlights the liquid droplet 204 to illuminate the liquid droplet 204 along the Y direction. Mirrors 210 are arranged to define an optical path 212a to direct images of the liquid droplet 204 back to a lens 214 of a camera 216. Thus, the first light source 208a illuminates the liquid droplet 204 such that the light illuminating the liquid droplet 204 along the X direction created by the first light source 208a pass to a first mirror 210a that reflects of the light illuminating the liquid droplet 204 along the X direction to a second mirror 210b. The second mirror 210b reflects the light illuminating the liquid droplet 204 along the X direction to a third mirror 210c that reflects the light illuminating the liquid droplet 204 along the X direction into the camera 216. In accordance with various embodiments, the third mirror 210c is angled to create a two axis side by side/superimposed image in the field of view of the camera 216. The second light source 208b illuminates the liquid droplet 204 along the Y direction such that the light illuminating the liquid droplet 204 along the Y direction are directed straight along a second optical path 212b to the camera 216. Thus, the second light source 208b directly illuminates the liquid droplet 204 along the Y direction such that the light illuminating the liquid droplet 204 along the Y direction created by the second light source 208b pass through the third mirror 210c and to the camera 216. Thus, the third mirror 210c is generally a beam or light splitter that is common to both image paths 212a, 212b and reflects the light illuminating the liquid droplet 204 along the X direction from the second mirror 210b into the camera 216 and passes light illuminating the liquid droplet 204 along the Y direction created by the second light source 208a into the camera 216. In accordance with an embodiment, the third mirror 210c comprises a coaxial mirror such as, for example, a 50/50 coaxial mirror, a 60/40 coaxial mirror, a 70/30 coaxial mirror, etc.

In accordance with various embodiments, the light sources 208 comprise, for example, direct current (DC) light sources, light emitting diode (LED) light sources, alternating current (AC) light sources, etc. The camera 216 generally comprises a digital camera, a CCD camera, etc. Due to the difference in length between the optical paths 212a, 212b, lenses (not illustrated) may be provided within one or both of the optical paths 212a, 212b and/or within the camera 216 to account for the difference in the paths (i.e. the length) of the optical paths 212a, 212b. Such lenses can also allow for fine tuning of images created by the apparatus 200a.

Figure 2B:
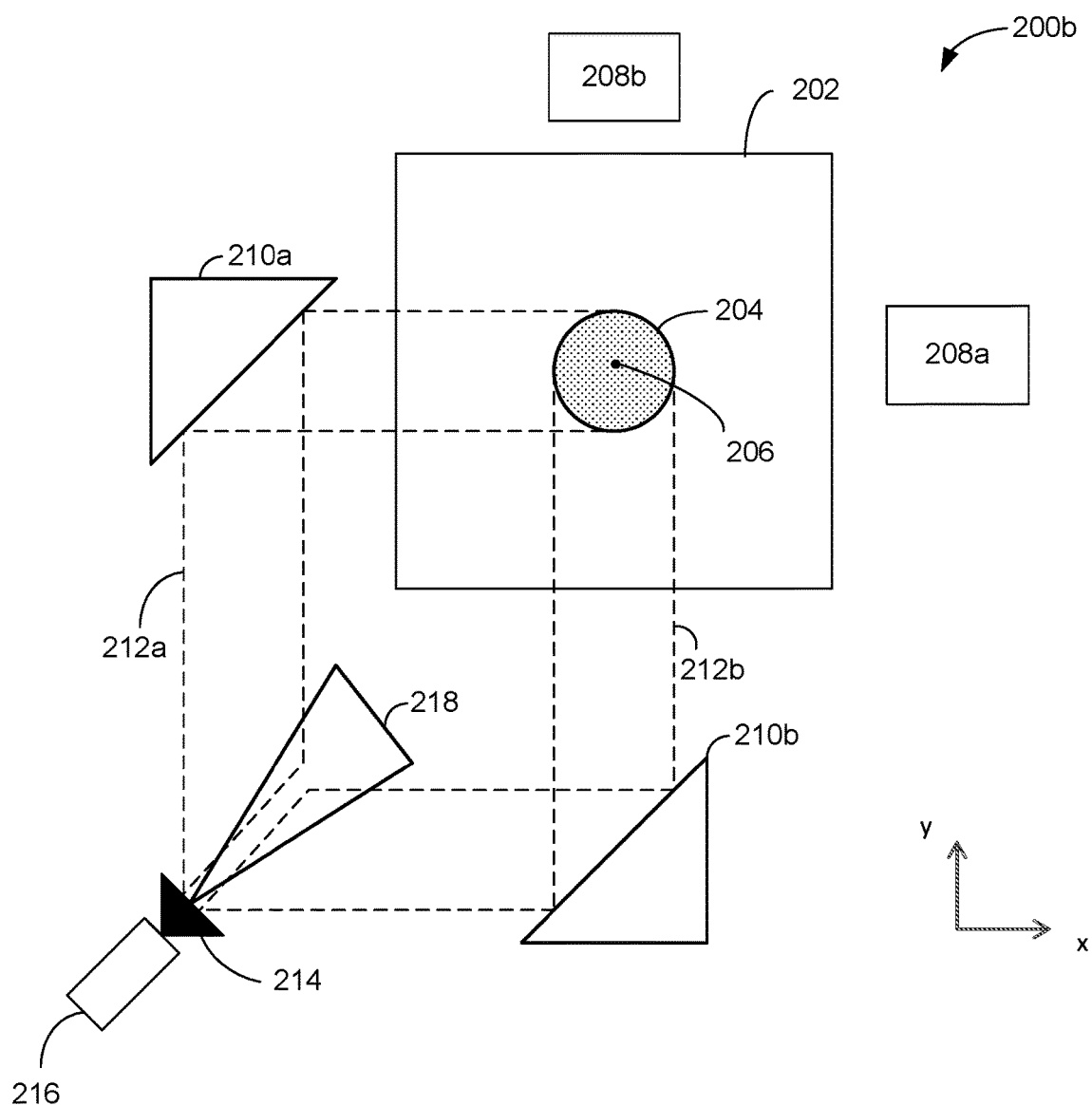

FIG. 2B schematically illustrates another example of an embodiment of an apparatus 200b for measuring contact angles of a liquid droplet on an interface, in accordance with various embodiments. The apparatus 200b can be used to obtain multiple contact angle measurements as will be described further herein. An interface 202, such as a substrate, includes a liquid droplet 204 located thereon. The interface 202 is located on a platform (not illustrated in FIG. 2B). A dispensing needle 206 that dispenses the liquid droplet 204 is centered with respect to the liquid droplet 204 as will be discussed further herein. Two light sources 208 backlight the liquid droplet 204 to illuminate the liquid droplet 204. Light illuminating the liquid droplet along the X and Y directions is directed by mirrors 210 that define optical paths 212a, 212b to a camera 216. A light splitter 218 is provided that is common to both optical paths 212a, 212b and directs the light illuminating the liquid droplet 204 along the X and Y directions from the mirrors 210 into the lens 214 of the camera 216. A first light source 208a illuminates the liquid droplet 204 such that the light illuminating the liquid droplet 204 along the X direction created by the first light source 208a passes to a first mirror 210a that reflects the light illuminating the liquid droplet 204 along the X direction to a light splitter 216, which reflects the light illuminating the liquid droplet 204 along the X direction into the camera 216. A second light source 208b illuminates the liquid droplet 204 such that the light illuminating the liquid droplet 204 along the Y direction created by the second light source 208b passes to a second mirror 210b that reflects the light illuminating the liquid droplet 204 along the Y direction to the light splitter 216, which reflects the light illuminating the liquid droplet 204 along the X direction into the camera 2164. Thus, in the embodiment of FIG. 2B, the paths (i.e. the length) of the optical paths 212a and 212b are of equal length allowing one less mirror 210 to be included and the camera 216 to be located at a corner of the apparatus 200b as opposed to along an edge of the apparatus 200a as in the arrangement of FIG. 2A.

As previously noted, in accordance with various embodiments, the light sources 208 comprise, for example, direct current (DC) light sources, light emitting diode (LED) light sources, alternating current (AC) light sources, etc. The camera 216 generally comprises a digital camera, a CCD camera, etc.

As is known, the apparatuses 200a, 200b generally include other components that have been omitted for clarity and simplicity.

Figure 1A:
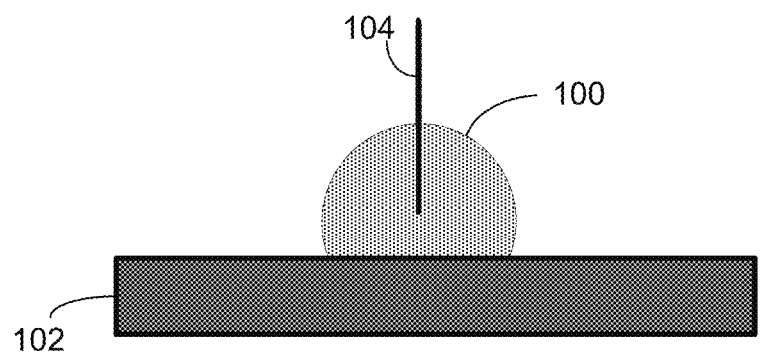
FIGS. 1A and 1B are schematic illustrations of a liquid droplet on an interface where a dispensing needle is centered along one direction but not centered along another direction.
Figure 1B:
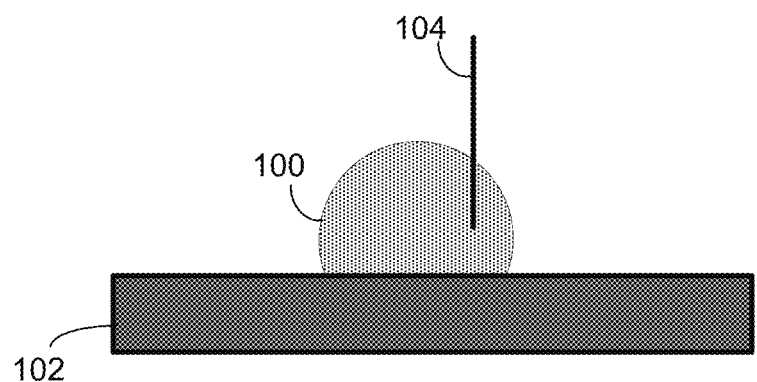
Figure 3A:
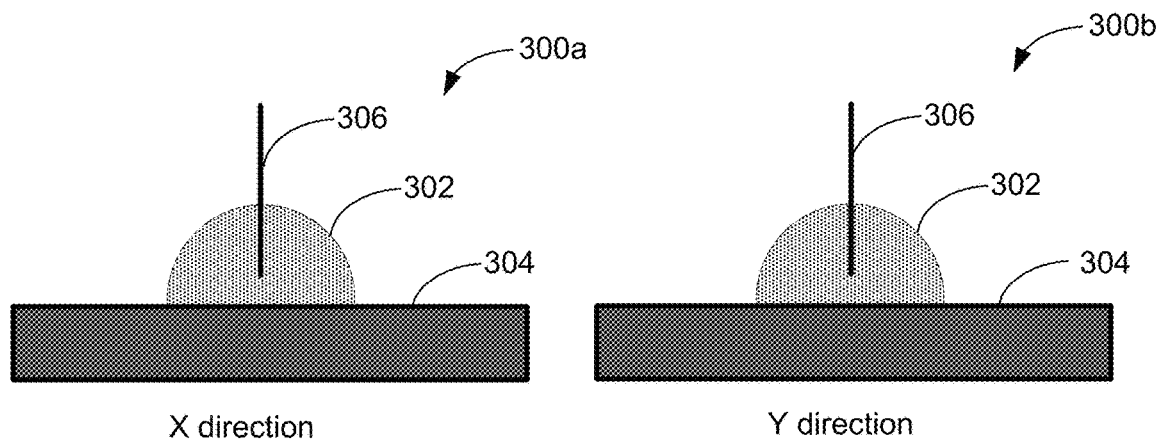
FIG. 3A schematically illustrates an example of an image that can be produced by the camera of the apparatuses of FIGS. 2A and 2B.

FIG. 3A schematically illustrates an example of two images 300a, 300b that can be produced by the camera 216 of the apparatuses 200a, 200b. For example, FIG. 3A may represent a graphical user interface (GUI) of a display (not illustrated) of the apparatuses 200a, 200b. The first image 300a illustrates a liquid droplet 302 on an interface 304 with a dispensing needle 306 centered with respect to the liquid droplet 302 within the X plane. The second image 300b illustrates the needle 306 centered with respect to the liquid droplet 302 with respect to the Y direction. While the images 300a, 300b illustrated in FIG. 3A illustrate the needle 306 centered along both the X and Y directions with respect to the liquid droplet 302, as can be seen in FIG. 1B, the needle 306 may not always be centered with respect to the liquid droplet 302 along at least one of the X and Y directions.

Figure 3B:
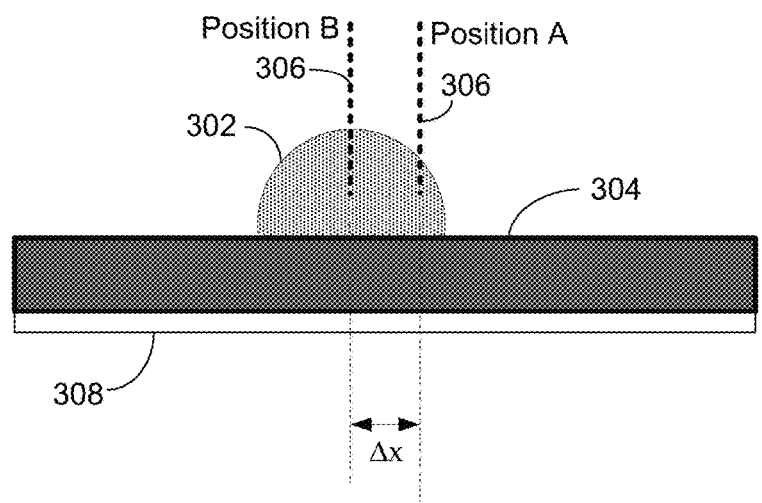
FIG. 3B schematically illustrates an example of moving a dispensing needle in order to center the needle along a particular direction.

FIG. 3B schematically illustrates an example of moving the needle 306 in order to center the needle 306 along a particular direction, for example the X direction, with respect to the liquid droplet 302. The liquid droplet 302 is located on the interface 304, which is supported on a platform 308. As can be seen, the needle 306 needs to be moved from position A to position B relative to the liquid droplet 302 so that the needle 306 is centered with respect to the liquid droplet 302. The distance that the needle 306 needs to be moved from position A to position B is represented by $\Delta X$. While observing the liquid droplet 302 with an apparatus (e.g., apparatuses 200a, 200b), the interface 304 (via the platform 308) or the needle 302 can be physically moved in order to relatively move the needle 306 from position A to position B with respect to the liquid droplet 302, thus substantially reducing or eliminating the error in position represented by $\Delta X$. A motor (not illustrated) can be used to move either the platform 308 or the needle 306.

Figure 4:
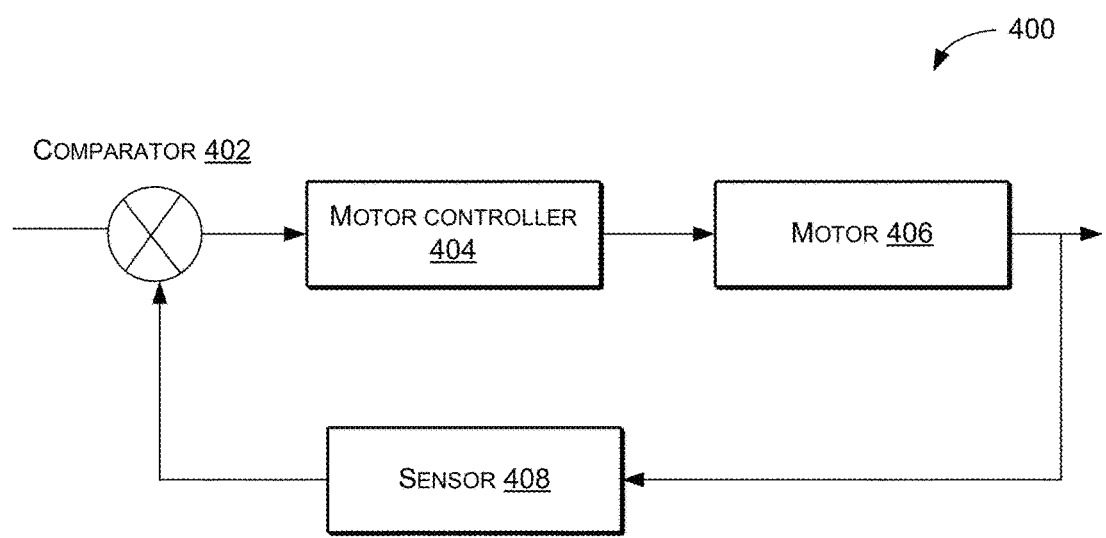
FIG. 4 schematically illustrates an example of a control loop that is in the form a feedback loop for controlling movement of a platform of the apparatuses of FIGS. 2A and 2B or a dispensing needle.

FIG. 4 schematically illustrates an example of a control loop 400 that is in the form a feedback loop that is implemented by a controller (not illustrated), generally in the form of one or more processors, for controlling movement of the platform 308 and/or the needle 306 relative to one another. A comparator 402 of the control loop 400 is set to correspond to the current position of the needle 306 at position A. A motor controller 404 controls one or more motors 406 to move one or both of the platform 308 and/or the needle 306 so that the needle 306 moves relative to the liquid droplet 302 until the needle 306 is located at position B. A sensor 408 within the control loop 400 senses the position of the needle 302 from the images provided by a camera of the apparatus (e.g., apparatuses 200a, 200b) and provides the information to the comparator 402, which updates the position of the needle 306. As the needle 306 moves from position A to position B, the positional error ΔX is lowered. Once the positional error ΔX equals zero, or some acceptable threshold with respect to zero, then movement of the platform 308 or the needle 306 can stop. With the needle 306 properly positioned, a process for obtaining contact angle measurements can commence.

To obtain contact angle measurements using an apparatus (e.g., apparatuses 206a, 206b), a liquid droplet 204 is placed on an interface 202, such as, a surface of a substrate (e.g., a substrate having a hydrophobic surface for use within pixels of an electrowetting device). The substrate is supported by a platform of the apparatus. The liquid droplet 204 generally has an initial diameter of approximately two millimeters. The liquid can be any suitable liquid such as, for example, water, alcohol, etc.

Prior to dispensing the liquid droplet 204, the distance from the interface of a dispensing needle 206 of a syringe that dispenses the liquid droplet 204 is determined. The camera of the apparatus is then focused on the needle 206 and the needle 206 is centered with respect to the liquid droplet 204 along the X and Y directions.

The initial volume of the liquid droplet 204 is then dispensed onto the interface 202. With the centered and focused needle properly positioned, the camera of the apparatus begins to create a video of the liquid droplet 204 based upon the light illuminating the liquid droplet 204 produced by the light sources within the apparatus. The volume of the liquid droplet 204 is gradually increased to a final volume during the video creation. The volume of the liquid droplet 204 is generally in a range of two millimeters in diameter for the initial volume to a final volume of approximately four millimeters in diameter. In general, the video obtained by the camera is at a rate of approximately 10 frames per second. Depending upon the application, the rate may be faster or slower as desired.

Once the final volume of the liquid droplet 204 is reached, then the liquid droplet 204 is retreated back to roughly the initial volume, i.e., the needle 206 pulls some of the volume of the liquid droplet 204 back up into the syringe. The camera then stops creating the video and the video is analyzed.

To help ensure the centering of the needle 206 relative to the liquid droplet 204, the distance of the needle 206 from the interface 202 should be adjusted first and the position of the needle 206 is then recorded (i.e. the needle 206 moves in a Z direction towards the interface 202). The distance between the needle 206 and the interface 202 is increased sufficiently to create enough space to generate a liquid droplet 204 that will fall on the interface 202 such that the liquid droplet 204 is not touching the needle 206. The needle 206 is then moved such that the needle 206 just contacts the surface of the liquid droplet 204 and the needle's position is set in the center of the liquid droplet 204. Then with an iterative loop, the needle 206 is immersed step by step in the liquid droplet 204 and the volume of the liquid droplet 204 is increased and decreased as previously described. In some cases (hydrophobic surfaces with water for example), the liquid droplet 204 will tend to move if nothing else is done. So during the immersion of the needle 206 in the liquid droplet 204, the centering is continually analyzed and set via X/Y motors that relatively move the needle 206 and/or the interface 202 with respect to each other. When the needle 206 reaches about half of the height of the liquid droplet 204, the immersion is completed and the needle 206 can be moved to be set at the initial recorded position without issues of X/Y droplet motions.

The analysis of the video includes calculating multiple contact angle measurements based upon the images in the video as the liquid droplet spreads on the interface. Because the liquid droplet is observed along both the X direction and the Y direction, four separate contact angle measurements can be obtained. In other words, along the X direction, a contact angle measurement can be obtained for both the right side of the liquid droplet and the left side of the liquid droplet within an image, while along the Y direction, the contact angle measurement can be obtained with respect to the right side of the liquid droplet and the left side of the liquid droplet within an image. Thus, multiple contact angle measurements for each of the four sides of the liquid droplet viewed (two sides along the X direction and two sides along the Y direction) are obtained from the video.

With the multiple measurements along the X and Y directions, as well as the obtaining of measurements throughout the growth and retraction of the liquid droplet, accuracy of the contact angle measurements is improved. Furthermore, reproducibility of the contact angle measurements is also improved. In general, more contact angle measurements are obtained in comparison to using a conventional goniometer. Results in obtaining the contact angle measurements are also improved due to the focus and centering of the dispensing needle along both the X and Y directions. By analyzing the growth and retraction of the liquid droplet with the multiple contact angles from the multiple views, the quality of the interface surface, i.e., a substrate surface, can be analyzed in order to determine the quality and wettability of the substrate surface. It will be understood that a separate needle and syringe can be used to dispense the liquid droplet and a different needle can be focused on and centered with respect to the liquid droplet.

Figure 5A:
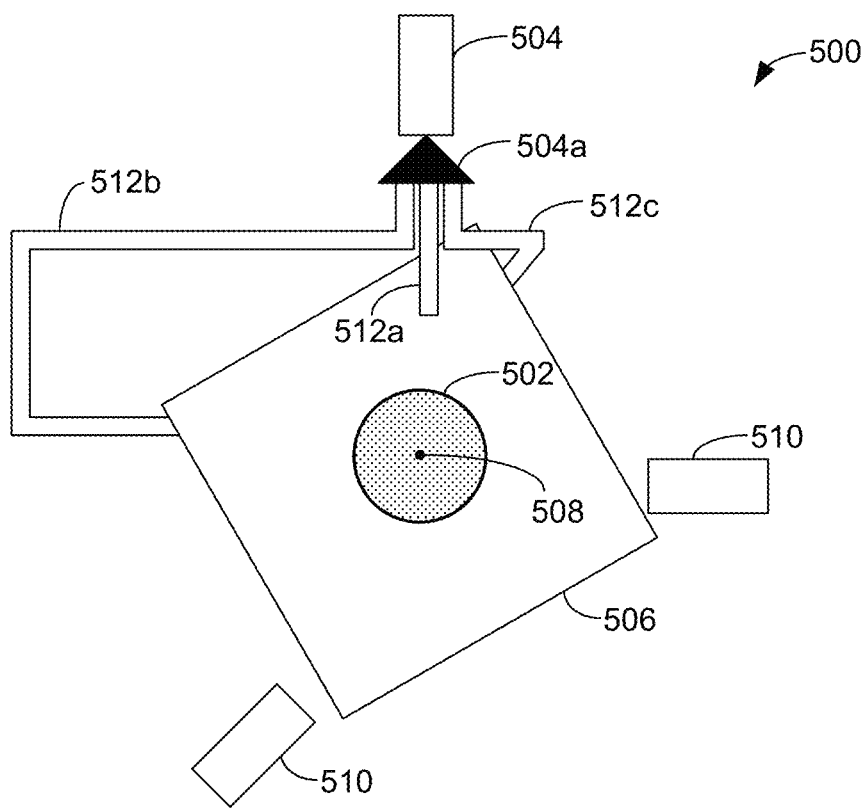
FIGS. 5A-5C schematically illustrate an example embodiment of a multi-view apparatus for measuring contact angles of a liquid droplet on an interface configured to observe a liquid droplet along three directions.

FIG. 5A schematically illustrates an embodiment of a multi-view apparatus 500 for measuring contact angles of a liquid droplet on an interface, wherein the apparatus 500 can observe a liquid droplet 502 along three directions, i.e., the X, Y and Z directions. In such an embodiment, a camera 504 that includes a lens 504a is placed above an interface 506 on which the liquid droplet 502 is placed by a dispensing needle 508. Light sources 510 are provided to illuminate the liquid droplet 502 on the interface 506. Light illuminating the liquid droplet 502 along the Z direction will be directly received by the camera 504 above the interface 506 along the image path 512a. The light illuminating the liquid droplet 502 is also routed along the various optical paths 512b, 512c by mirrors (not illustrated) that direct the light illuminating the liquid droplet 502 into the camera 504 in a manner similar to what has been previously described herein. Thus, the image paths 512 generally correspond to the three directions, i.e. the X, Y and Z directions.

The camera 504 is placed above the interface 506 such that the camera 504 does not interfere with dispensing of the liquid droplet 502. In accordance with various embodiments, the camera is positioned below the interface 506. In such embodiments, the interface 506 and a platform supporting the interface (not illustrated) are transparent.

Figure 5B:
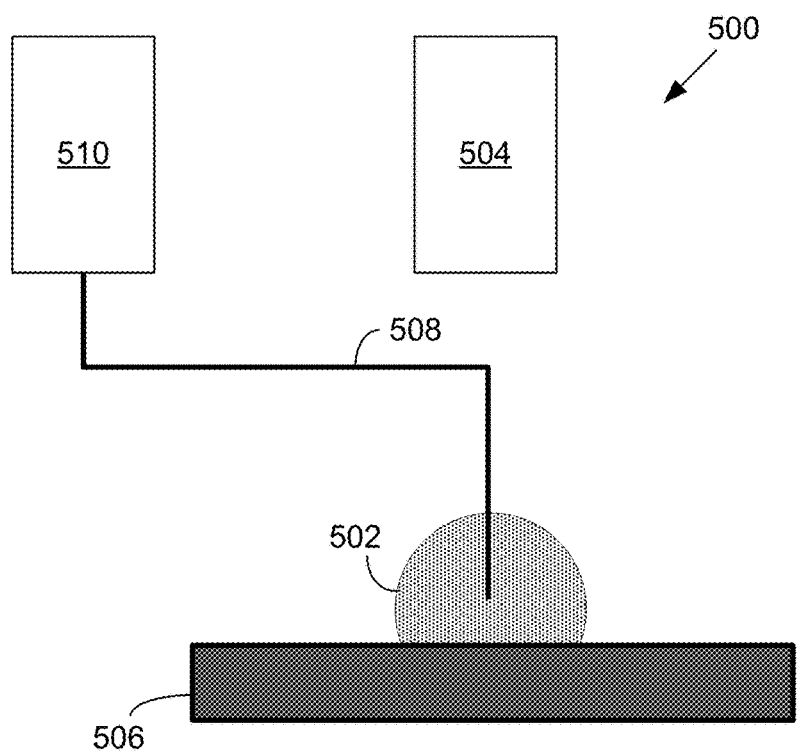
Figure 5C:
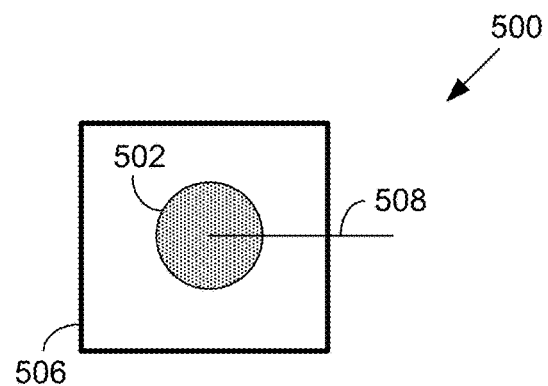

As can be seen in FIGS. 5B and 5C, if the interface 506 and platform (not illustrated) supporting the interface 506 are not transparent, it is necessary that a dispensing system, e.g., a syringe, dispensing the liquid droplet 502 is not located in the field of view of the camera 504. Thus, to achieve similar results with non-transparent interfaces, a dispensing system 508 should be adapted in order to supply the liquid droplet 502 through a thin capillary system 510 that will only slightly alter the top view of the liquid droplet 502 on the interface 506 as seen in FIG. 5C.

Figures 6A, 6B, 6C:
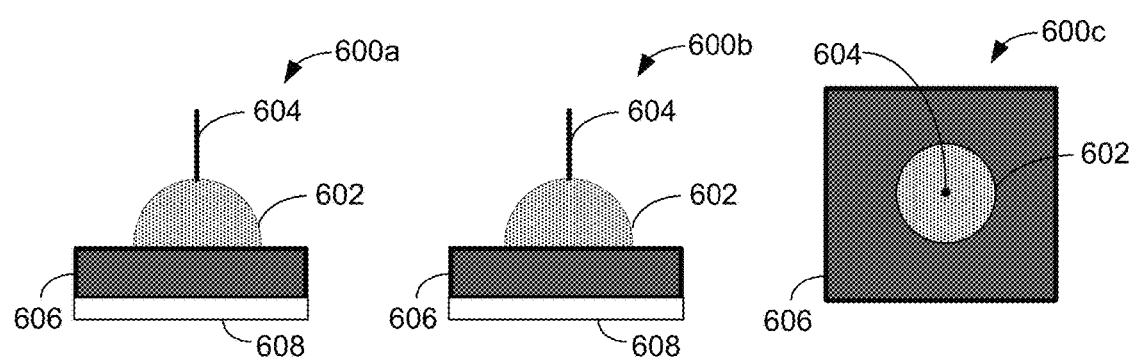
FIGS. 6A-6C schematically illustrate three images of a liquid droplet that can be provided for centering a needle using the apparatus of FIGS. 5A-5C.

FIGS. 6A, 6B and 6C schematically illustrate three images 600a, 600b and 600c of a liquid droplet 602 that can be provided for centering a needle 604 using the apparatus 500 of FIGS. 5A, 5B and 5C. The liquid droplet 602 is positioned on an interface 606 that is supported by a platform 608 of an apparatus (e.g., apparatus 500). The first image 600a represents an image of the liquid droplet 602 along the X direction. The second image 600b represents an image of the liquid droplet 602 along the Y direction, while the third image 600c represents an image of the liquid droplet 602 along the Z direction. By utilizing three directions to center and focus the needle 604 before obtaining contact angle measurements, the accuracy and reproducibility of the contact angle measurements may be further improved.

Figure 7:
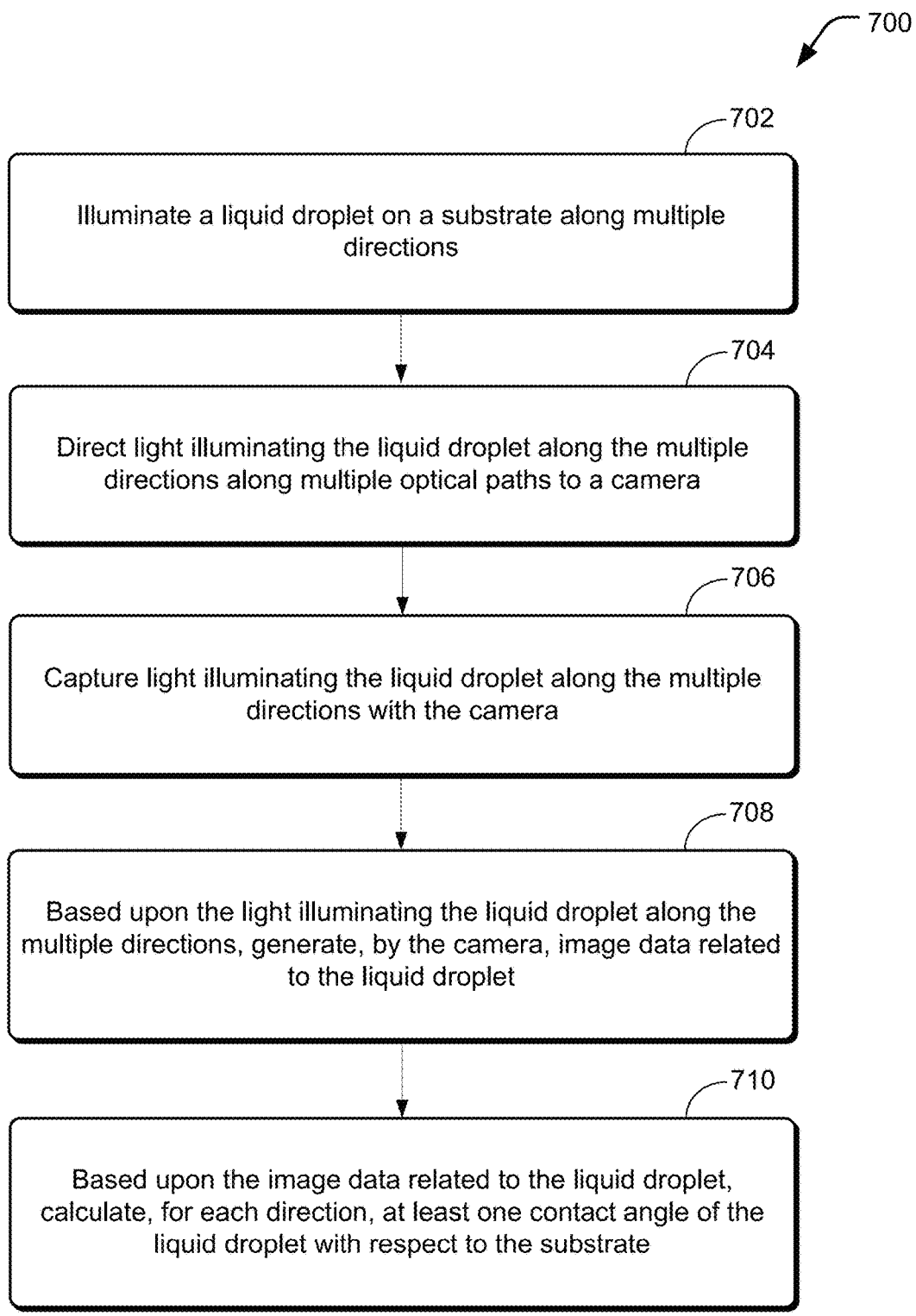
FIG. 7 is a flowchart illustrating an example of a process of capturing images of a liquid droplet on an interface along multiple directions.

FIG. 7 is a flow diagram of an illustrative process, of which one or more steps may be implemented within apparatuses 200a, 200b. This process (as well as other processes described throughout) is illustrated as a logical flow graph, each operation of which represents a sequence of operations that can be partly or wholly implemented by hardware, software, or a combination thereof. In the context of software, the operations represent computer-executable instructions stored on one or more tangible, non-transitory computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

FIG. 7 is a flowchart illustrating an example of a process 700 of capturing images of a liquid droplet on an interface within multiple planes. Such a process may be implemented using, for example, a multi-view apparatus for measuring contact angles of a liquid droplet on an interface, such as apparatuses 200a, 200b or 500. At 702, a liquid droplet on a substrate is illuminated along multiple directions. At 704, light illuminating the liquid droplet along the multiple directions is directed along multiple optical paths to a camera. At 706, the light illuminating the liquid droplet along the multiple directions is captured with the camera. At 708, based upon the light illuminating the liquid droplet along the multiple directions, image data related to the liquid droplet is generated by the camera. At 710, based upon the image data related to the liquid droplet, at least one contact angle of the liquid droplet with respect to the substrate is calculated for each direction.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that there may be numerous variations to the above descriptions, and that the examples and the accompanying figures are merely to illustrate one or more examples of implementations.

It will be understood by those skilled in the art that various other modifications can be made, and equivalents can be substituted, without departing from claimed subject matter. Additionally, many modifications can be made to adapt a particular situation to the teachings of claimed subject matter without departing from the central concept described herein. Therefore, it is intended that claimed subject matter not be limited to the particular embodiments disclosed, but that such claimed subject matter can also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter can be practiced without these specific details. In other instances, methods, devices, or systems that would be known by one of ordinary skill have not been described in detail so as not to obscure claimed subject matter.

Reference throughout this specification to "one embodiment" or "an embodiment" can mean that a particular feature, structure, or characteristic described in connection with a particular embodiment can be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described can be combined in various ways in one or more embodiments. In general, of course, these and other issues can vary with the particular context of usage. Therefore, the particular context of the description or the usage of these terms can provide helpful guidance regarding inferences to be drawn for that context.

What is claimed is:

1. A contact angle measuring apparatus configured to obtain views of a liquid droplet on a substrate within an X-Y plane, the apparatus comprising:
    a platform configured to support the substrate and the liquid droplet on a surface of the substrate;
    a camera adjacent to the platform, wherein the camera is configured to receive light that illuminates the liquid droplet to generate image data related to the liquid droplet;
    a first light source positioned to illuminate the liquid droplet to illuminate the liquid droplet along a first direction of the X-Y plane;
    a first reflective surface to establish a first optical path configured to direct the light of the first light source illuminating the liquid droplet to the camera, wherein the first optical path comprises at least one mirror;
    a second light source positioned to illuminate the liquid droplet to illuminate the liquid droplet along a second direction of the X-Y plane;

a second reflective surface to establish a second optical path and to direct the light of the second light source illuminating the liquid droplet to the camera;
a beam splitter in the first optical path and in the second optical path such that (i) illumination of the liquid droplet by the first light source is reflected from the first mirror to the beam splitter and to the camera and (ii) illumination of the liquid droplet by the second light source is reflected from the second mirror to the beam splitter and to the camera;
a dispensing needle configured to dispense the liquid droplet onto the substrate;
a motor to move the platform relative to the dispensing needle in order to center the dispensing needle that dispenses the liquid droplet within the first plane and the second plane with respect to the liquid droplet; and
a controller configured to calculate contact angles of the liquid droplet on the surface of the substrate based upon the image data related to the liquid droplet generated by the camera.

2. The apparatus of claim 1, wherein:
the camera is positioned along an edge of the platform;
the at least one mirror of the first optical path comprises a first mirror and a second mirror; and
the beam splitter comprises a 50/50 coaxial mirror.

3. The apparatus of claim 1, wherein
the camera is positioned at a corner of the platform;
the at least one mirror of the first optical path comprises a first mirror; and
the second optical path comprises a second mirror.

4. An apparatus for measuring contact angles comprising:
a platform configured to support a substrate;
a camera configured to capture an image of a liquid droplet on the interface wherein the captured image is based, at least in part, on light entering the camera;
a beam splitter to provide the light to the camera;
a first light source configured to illuminate the liquid droplet along a first direction;
a second light source configured to illuminate the liquid droplet along a second direction;
a first reflective surface to establish a first optical path configured to direct light illuminating the liquid droplet from the first light source to the camera via the beam splitter; and
a second reflective surface to establish a second optical path configured to direct light illuminating the liquid droplet from the second light source to the camera via the beam splitter,
wherein the captured image includes a first view of the liquid droplet adjacent to a second view of the liquid droplet, wherein the first view of the liquid droplet is based, at least in part, on light received from the first optical path and the second view of the liquid droplet is based, at least in part, on light received from the second optical path.

5. The apparatus of claim 4, further comprising:
a motor configured to move at least one of the platform or a liquid droplet dispensing needle relative to each other in order to center the liquid droplet dispensing needle along the first and the second directions with respect to the liquid droplet.

6. The apparatus of claim 5, further comprising a controller configured to control operation of the motor to control movement of at least one of the platform or the liquid droplet dispensing needle relative to each other in order to center the liquid droplet dispensing needle along at least the first direction and the second direction with respect to the liquid droplet.

7. The apparatus of claim 4, wherein:
the first optical path comprises two mirrors that direct light illuminating the liquid droplet from the first light source to the beam splitter.

8. The apparatus of claim 4, wherein:
the first optical path comprises a first mirror that directs light illuminating the liquid droplet from the first light source to the beam splitter that; and
the second optical path comprises a second mirror that directs light illuminating the liquid droplet from the second light source to the beam splitter.

9. The apparatus of claim 4, wherein the first and the second light sources comprise one or more of a direct current (DC) light source, a light emitting diode (LED), or an alternating current (AC) light source.

10. The apparatus of claim 4, wherein the camera comprises one of a digital camera or a charge-coupled device (CCD) camera.

11. A method comprising:
illuminating a liquid droplet on a substrate along multiple directions;
directing light illuminating the liquid droplet along the multiple directions along multiple optical paths to a camera via a beam splitter that collects light from the multiple optical paths;
capturing, with the camera, via the beam splitter, the light illuminating the liquid droplet along the multiple directions;
based upon the light illuminating the liquid droplet along the multiple directions, generating, by the camera, image data related to the liquid droplet, wherein the image data includes multiple views of the liquid droplet adjacent to one another, wherein the multiple views of the liquid droplet are based, at least in part, on light received respectively from the multiple optical paths; and
based upon the image data related to the liquid droplet, calculating, for each direction, at least one contact angle of the liquid droplet with respect to the substrate.

12. The method of claim 11, further comprising:
centering a needle with respect to the liquid droplet along the multiple directions.

13. The method of claim 12, wherein centering the needle with respect to the liquid droplet along the multiple directions comprises moving at least one of the substrate or the needle.

14. The method of claim 13, wherein centering the needle with respect to the liquid droplet along the multiple directions comprises moving the substrate.

15. The method of claim 11, wherein directing the light illuminating the liquid droplet along multiple optical paths to a camera comprises:
directing light illuminating the liquid droplet from a first light source along a first optical path of the two optical paths that comprises two mirrors to the light splitter that directs the light illuminating the liquid droplet from the first light source to the camera; and
directing light illuminating the liquid droplet from a second light source along a second optical path of the two optical paths to the light splitter that directs the light illuminating the liquid droplet from the second light source to the camera.

16. The method of claim 11, wherein directing light illuminating the liquid droplet along multiple optical paths to a camera comprises:
- directing light illuminating the liquid droplet from a first light along a first optical path of the two optical paths that comprises a first mirror that directs the light illuminating the liquid droplet from the first light source to the beam splitter that directs the light illuminating the liquid droplet from the first light source to the camera; and
- directing light illuminating the liquid droplet from a second light source along a second optical path of the two optical paths that comprises a second mirror that directs the light illuminating the liquid droplet from the second light source to the beam splitter that directs the light illuminating the liquid droplet from the second light source to the camera.

17. The method of claim 11, wherein directing the light illuminating the liquid droplet along multiple optical paths to a camera comprises directing the light illuminating the liquid droplet along three optical paths that correspond to three directions.

18. The method of claim 11, further comprising:
- based upon the light illuminating the liquid droplet, calculating two contact angles of the liquid droplet with respect to the substrate along each direction, wherein the contact angles are with respect to opposite sides of the liquid droplet along each direction.

* * * * *